3,365,404
PROCESS FOR POLYMERIZING EPOXIDES USING AS CATALYST THE REACTION PRODUCT OF CALCIUM HEXAMMONIATE AND TRIPHENYL-METHANE OR FLUORENE
Frederick E. Bailey, Jr., Charleston, and Haywood G. France, South Charleston, W. Va., assignors to Union Carbide Corporation, a corporation of New York
No Drawing. Continuation-in-part of application Ser. No. 36,180, June 15, 1960. This application July 30, 1964, Ser. No. 386,444
6 Claims. (Cl. 260—2)

ABSTRACT OF THE DISCLOSURE

There is disclosed a new catalyst for the polymerization of vicinal epoxides. The catalyst is the reaction product of either triphenylmethane or fluorene with calcium hexammoniate. The polymers can be used as thickening agents, flocculating agents, coagulants, moldings, and castings.

---

This application is a continuation-in-part of application Serial No. 36,180, filed on June 15, 1960, now abandoned.

This invention relates to a process for the preparation of catalyst compositions which are suitable for use in the polymerization of vic-epoxy compounds and to a process for the polymerization of said vic-epoxy compounds.

In one aspect, the invention is directed to a process for producing catalytically active materials particularly adapted for use in polymerizing vic-epoxy compounds which comprises reacting calcium hexammoniate with from about 0.5 to about 2.0 moles per mole of said calcium hexammoniate of at least one member selected from the group consisting of triphenylmethane and fluorene, said reaction being conducted in an excess liquid ammonia medium, and subsequently evaporating from the resulting reaction mixture the excess liquid ammonia, thereby obtaining a residue product which is catalytically active in effecting the polymerization of vic-epoxy compounds. In another aspect, the invention is directed to a process which comprises contacting a vic-epoxy compound with a catalytically significant quantity of the residue product described above, for a period of time sufficient to produce a polymer.

The novel compositions of this invention are particularly suitable for polymerizing lower alkylene oxides, and most particularly, for polymerizing ethylene oxides. Poly(ethylene oxide), for example, is a polymer having great commercial utility for a variety of uses, for example, thickening agents, flocculating agents, warp sizing, and the like.

The catalyst compositions provided by this invention are prepared by the reaction of calcium hexammoniate with triphenylmethane and/or fluorene, in a liquid ammonia medium. In principle, the reaction temperature can range from above about the freezing point of ammonia, that is from above about −78° C., to the critical temperature of ammonia, which is about 133° C. At temperatures above the boiling point of ammonia, that is, above about −33° C., pressurized equipment is required in order to keep the ammonia in the liquid state. The preferred temperature range is from above about the freezing point of ammonia to about 25° C. An upper temperature limit of about 10° C. is highly preferred.

Calcium hexammoniate is prepared by dissolving calcium in liquid ammonia. Typically, in carrying out the process of this invention, the calcium is dissolved in an excess of liquid ammonia, after which the hydrocarbon reagent (triphenylmethane or fluorene or both) is slowly added.

Following the addition of the hydrocarbon reagent, which is done at the temperature and pressure conditions outlined above, the excess liquid ammonia is permitted to evaporate or weather away, to leave a residue product which comprises the catalyst of this invention. It is preferred that the evaporation be accomplished in an inert atmosphere, for example, nitrogen, helium, and the like, in order to prevent the residue product from contacting oxygen, water vapor, or carbon dioxide. It is further preferred that the residue product be suspended or slurried in an inert, normally-liquid organic vehicle in order to better protect the catalytically active residue product from exposure to the atmosphere. Examples of organic liquids which can be employed for this purpose include aliphatic and cycloaliphatic hydrocarbons such as hexane, heptane, cyclohexane, methylcyclohexane, and the like; dioxane; aromatic hydrocarbons such as benzene and toluene; and the lower dialkyl ethers of alkylene glycols such as the dimethyl, diethyl or dipropyl ethers of ethylene glycol and of diethylene glycol; and the like.

During the addition of the reagents to the liquid ammonia, it is desirable to agitate the reaction mixture. The vessel containing the liquid ammonia can be partially immersed in, for example, a Dry Ice-acetone bath. After the addition of the reagents has been completed, the Dry Ice-acetone bath can be removed to permit the vessel to warm up and to thereby cause the excess liquid ammonia to boil away.

The proportion of hydrocarbon reagent, or mixtures thereof, can be varied over a wide range, for example, from about 0.5 mole to about 2.0 moles of hydrocarbon per mole of calcium hexammoniate. The term "excess" in the expression "excess liquid ammonia" means that the liquid ammonia is employed in amounts greater than that amount which is required to react with calcium to form calcium hexammoniate. Thus, the liquid ammonia is employed in a portion of greater than six moles of ammonia per mole of calcium. As long as greater than six moles of ammonia per mole of calcium are employed, the exact amount of ammonia used is not critical.

The catalytically-active residue product contains calcium alkyl, either triphenylmethylcalcium or fluorenylcalcium, or both. When two moles of hydrocarbon reagent are employed per mole of calcium hexammoniate, the residue product is found to contain little or no nitrogen. In this case, the residue product consists essentially of calcium alkyl, and is particularly useful in catalyzing the solution polymerization of vic-epoxy compounds.

Calcium hexammoniate and the catalyst compositions produced by the process of this invention are destroyed upon exposure to oxygen, water, carbon dioxide, aldehydes, carboxylic acids, and the like. It is, therefore, highly preferred that the reaction mixture and residue product therefrom be protected from the atmosphere and from contact with any of the reagents mentioned above.

The catalytically-active residue product is normally a friable solid. It can be employed as a solid (usually powdered) or as a suspension or slurry in an inert, normally-liquid organic vehicle. The slurry form is preferred because it is more readily protected from the atmosphere. Illustrative inert organic vehicles include saturated aliphatic and cycloaliphatic hydrocarbons such as hexane, heptane, cyclohexane, alkyl-substituted cyclohexane, alkyl-substituted cyclopentane, and the like; aromatic hydrocarbons such as benzene, toluene, xylene, and the like; the dimethyl and diethyl ethers of ethylene glycol, propylene glycol, diethylene glycol; and the like.

As has been indicated hereinabove, the hydrocarbon reagents which have been found to form catalytically active products when reacted with calcium hexammoniate according to the process of this invention are fluorene and triphenylmethane or mixtures thereof.

The process for polymerizing vic-epoxy compounds in accordance with the invention comprises contacting a vic-epoxy compound, or mixtures thereof, with a catalytically significant quantity of the catalyst composition provided by this invention, for a period of time sufficient to produce a polymer.

As used herein, the term "vic-epoxy" refers to the group

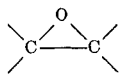

wherein an oxygen atom is bonded to adjacent or vicinal carbon atoms. The vic-epoxy compounds which can be polymerized by the catalyst compositions provided by this invention are those compounds which contain only carbon, hydrogen, ether oxygen, and oxirane oxygen. These vic-epoxy compounds are represented by the formula

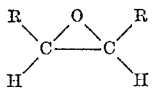

wherein each R individually can be hydrogen or a hydrocarbon or hydrocarbyloxyalkyl radical such as, for example, alkyl, alkoxymethyl, alkenyl, alkenyloxymethyl, aryl, aryloxymethyl, cycloalkyl, aralkyl, or alkaryl radicals that have, for instance, up to 8 carbon atoms. In addition, both R variables can be alkylene radicals which, together with the carbon atoms of the vic-epoxy group, form a saturated cycloaliphatic nucleus containing from 4 to 8 carbon atoms, and preferably from 5 to 7 carbon atoms, for example, cycloalkyl, alkyl-substituted cycloalkyl, cyclobutyl, cyclopentyl, cyclohexyl, cycloheptyl, cyclooctyl, 2-methylcyclopentyl, and the like. Illustrative R radicals include, methyl, ethyl, propyl, butyl, butyloxymethyl, isobutyl, pentyl, hexyl, dodecyl, octadecyl, phenyl, phenyloxymethyl, benzyl, tolyl, allyloxymethyl, ethylphenyl, butylphenyl, phenethyl, cyclopentyl, cyclohexyl, 2-methylcyclohexyl, cycloheptyl, and the like. The vic-epoxy compounds can be employed either singly or in admixture with at least one other vic-epoxy compound as the monomeric feed. Preferred vic-epoxy compounds are the lower alkylene oxides of from 2 to 4 carbon atoms such as ethylene oxide, propylene oxide, 1,2-epoxybutane, 2,3-epoxybutane, and the like. Ethylene oxide is highly preferred.

Representative vic-epoxy compounds which can be employed in the polymerization process include, for example, ethylene oxide, propylene oxide, 1,2-butylene oxide, 2,3-butylene oxide, allyl glycidyl ether, the epoxypentanes, the epoxyhexanes, 2,3-epoxyheptane, nonene oxide, 5-butyl-3,4-epoxyoctane, 1,2-epoxydodecane, 2,4,4-trimethyl-2,3-epoxypentane, 1,2-epoxyhexadecane, vinyl 2,3-epoxypropyl ether, 1,2-epoxyoctadecane, 5-benzyl-2,3-epoxyheptane, 4-cyclohexyl-2,3-epoxypentane, styrene oxide, cyclohexane oxide, cyclopentene oxide, the oxabicycloalkanes and aliphatic-substituted oxabicycloalkanes such as 7-oxabicyclo[4.1.0]heptane, 3-vinyl-7-oxabicyclo[4.1.0]heptane, 6-oxabicyclo[3.1.0]hexane, 4-propyl - 7 - oxabicyclo[4.1.0]heptane, 3-amyl-6-oxabicyclo [3.1.0]hexane, and the like. The vic-epoxy compound will normally contain no more than 12 carbon atoms.

The catalyst compositions are employed in catalytically significant amounts. In general, a catalyst concentration of from about 0.02, and lower, to about 10, and higher, weight percent, based on total weight of the monomeric feed, is suitable. A concentration of from about 0.1 to about 3 weight percent, based on total weight of the monomeric feed, is preferred. For optimum results, the particular catalyst employed, its preparation, its surface area, the nature of the monomeric reagent(s), the temperature at which the polymerization is conducted, and other factors, will largely determine the desired catalyst concentration.

The polymerization can be conducted over a wide temperature range. A suitable temperature range is from about 10° C., and lower, to about 150° C., and higher. The particular temperature selected will depend largely on the nature of the reagents and the type of polymerization technique employed. For example, a bulk polymerization (in a bulk polymerization, the monomer is undiluted) is normally carried out at a temperature between about 10° C. and about 150° C., and preferably between about 90° C. and about 110° C. A polymerization carried out in solution is normally done at a temperature between about 10° C. and about 150° C., and preferably between about 90° C. and about 110° C. A suspension polymerization (a suspension polymerization is carried out in an inert, normally-liquid organic vehicle which is a solvent for the monomer but a non-solvent for the polymer) is normally carried out at a temperature in the range of from about 20° C. to about 50° C.

The polymerization reaction is carried out for a period of time sufficient to produce a polymer. The reaction time for the polymerization will depend upon the temperature, nature of vic-epoxy compound(s), nature of the catalyst, and other factors, and can vary from a few minutes to as long as several days. Generally, the reaction time will be from about 10 hours to about 48 hours.

When polymerizing a mixture containing two or more vic-epoxy compounds, the proportions of said compounds can vary over the entire range of concentrations.

It is highly desirable to conduct the polymerization under an inert atmosphere, such as nitrogen, in order to avoid contacting the catalyst with oxygen, water, carbon dioxide, and the like. Similarly, it is preferred that the monomer feed be substantially free of water, oxygen, carbon dioxide, reagents such as aldehydes, carboxylic acids, and the like, in order to avoid contact of said materials with the catalyst.

The polymerization process of this invention can be carried out by the bulk polymerization, solution polymerization, or suspension polymerization techniques. The process can be carried out in the presence of an inert, normally-liquid vehicle. Examples of such vehicles include aromatic hydrocarbons such as benzene, toluene, xylene, chlorobenzene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons including open chain, cyclic and alkyl-substituted cyclic hydrocarbons such as hexane, heptane, various normally-liquid petroleum hydrocarbon fractions, cyclohexane, the alkylcyclohexanes, cyclopentane, and the like.

The polymer can be recovered by conventional methods. For example, where the suspension polymerization technique is employed, the polymer can be filtered and then dried to remove substantially all of the inert organic diluent. Where the solution polymerization technique is employed, the polymer can be precipitated by dilution with a non-solvent, then the precipitate recovered by filtration and drying.

The polymerization process can be carried out in a sealed reaction vessel under the autogenous pressure of the reaction mixture. Gentle agitation is desirable. Where an inert organic diluent is employed, it is preferred that from about 3 to about 400 parts by weight of vic-epoxy compound be employed per 100 parts, by weight, of diluent.

A preferred embodiment of this invention is the bulk polymerization of ethylene oxide. This process is preferably carried out in a sealed vessel containing ethylene oxide and the novel catalyst of this invention, at about 80–110° C., and under the autogenous pressure of the reactants. The sealed vessel containing the reactants is then gently agitated for a time sufficient to polymerize the ethylene oxide. This process is preferably carried out as a batchwise operation.

Another preferred embodiment of this invention is the polymerization of ethylene oxide by the solution polymerization technique. By this process, ethylene oxide is dissolved in an inert, normally-liquid organic vehicle, for example, benzene or toluene, contained in a vessel containing the novel catalyst of this invention, at a temperature between about 90° C. and 110° C. and under a pressure sufficient to maintain said organic vehicle in a liquid state. The reaction mixture is preferably gently agitated for a time sufficient to produce a polymer, after which the polymeric product can be recovered by dilution with a non-solvent, such as hexane or heptane, which causes the polymer to precipitate. The process can be carried out batchwise, semi-continuously, or continuously.

The novel catalyst compositions of this invention are useful for producing poly(ethylene oxide), poly(propylene oxide), poly(butylene oxide), poly(pentylene oxide), poly(styrene oxide), and the like. These catalyst compositions are also useful for producing copolymers containing two or more of the monomers employed in producing the homopolymers listed above. Said copolymers can be prepared which cover a wide spectrum of properties. For example, polymers containing a high percentage of ethylene oxide units, for example, 50 percent or more by weight, are water-soluble, and can be used as thickening agents, coagulants, flocculating agents, and the like. The copolymers containing less than about 50 weight percent of ethylene oxide units are generally water insoluble, and can be used in many different applications, such as molding, casting, and the like. Another useful copolymer is a copolymer of allyl glycidyl ether and propylene oxide.

Modifications of the invention will be apparent to those skilled in the art, and are included within the invention as defined by the claims.

In the examples which follow, the term "reduced viscosity" is employed in connection with the polymeric products which are prepared. Reduced viscosity is regarded as being a measure of molecular weight. The reduced viscosity is a value obtained by dividing the specific viscosity by the concentration being measured in grams of polymer per 100 milliliters of solvent at a given temperature. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, for example, acetonitrile, at 30° C. The polymers produced by the process of the invention preferably have reduced viscosities of greater than about 0.1, preferably greater than about 0.3, up to about 20 or more.

EXAMPLE 1

Two grams (0.05 mole) of calcium were dissolved in 500 ml. of liquid ammonia which was contained in a vessel that was partially immersed in a Dry Ice-acetone bath. 6.1 grams (0.025 mole) of triphenylmethane were slowly added to this solution. The excess ammonia was allowed to weather off overnight, and a light colored red residue product was obtained which was ground to a fine powder under a nitrogen atmosphere.

A Pyrex glass polymerization tube was charged with 30 grams of ethylene oxide and 0.05 gram of said residue product, and was then sealed. The sealed glass tube was gently agitated at 90° C. for 98 hours. After this time there was obtained a 70–75 percent yield of poly(ethylene oxide) which had a reduced viscosity in acetonitrile of 0.92.

EXAMPLE 2

One and one-half grams of the residue product prepared in Example 1 were dispersed in 650 grams of dry heptane by stirring. The suspension, which was contained in a three-necked glass vessel, was gently agitated for 5.25 hours while ethylene oxide was bubbled through it. The reaction started at 25° C., and during polymerization rose to 33° C. No external heat was supplied to the reaction. Ten grams of poly(ethylene oxide) were produced in suspension, which were recovered by filtering and drying. The polymer had a reduced viscosity of 14.8 measured at a concentration of 0.2 gram per 100 milliliters of acetonitrile and 30° C.

EXAMPLE 3

Two grams of calcium (0.05 mole) were dissolved in 300 milliliters of liquid ammonia which was contained in a vessel that was partly immersed in a Dry Ice-acetone bath. 24.4 grams of triphenylmethane (0.1 mole) were slowly added to the solution. The excess ammonia was then allowed to weather off, and a red solid residue product was obtained which was ground to a fine powder under a nitrogen atmosphere, and was then dried at 57° C. under vacuum. This residue product was analyzed and was found to contain less than 0.5 weight percent nitrogen.

One-tenth of a gram of said residue product was charged to a Pyrex glass polymerization tube containing 30 grams of ethylene oxide. The tube was then sealed and agitated at room temperature (about 25° C.) for 7 days. Thirteen grams of polymer having a reduced viscosity of 14.8 in acetonitrile were obtained.

EXAMPLE 4

Two grams of calcium (0.05 mole) were dissolved in 500 milliliters of liquid ammonia. A solution of 12.2 grams (0.05 mole) of triphenylmethane in 150 milliliters of the diethyl ether of ethylene glycol was added slowly to the solution of calcium in liquid ammonia. The excess ammonia was allowed to weather off overnight, and a bright red suspension was obtained as the residue product.

Three milliliters of this suspension, containing 0.015 gram of calcium per milliliter (determined by titration), were charged to a Pyrex glass polymerization tube containing 30 grams of ethylene oxide. The tube was then sealed and agitated gently at room temperature for 42 hours. Four grams of polymer having a reduced viscosity of 6.88 in acetonitrile were recovered.

EXAMPLE 5

Two grams (0.05 mole) of calcium were dissolved in 300 milliliters of liquid ammonia. To this solution was added a solution of 4.2 grams (0.025 mole) of fluorene in 100 milliliters of the diethyl ether of ethylene glycol. The excess ammonia was permitted to weather off, and a yellow gold suspension was obtained as the residue product.

Three milliliters of this suspension containing 0.04 gram of calcium per milliliter (determined by titration) were added to a Pryex glass polymerization tube containing 30 grams of ethylene oxide. The tube was sealed and then gently revolved at room temperature for 6 days. After this time, 4 grams of polymer were recovered which had a reduced viscosity of 1.73 measured at a concentration of 0.2 gram of polymer in 100 milliliters of water at 30° C.

EXAMPLE 6

Sixteen and six-tenths grams (0.1 mole) of fluorene were slowly added to a solution of 2 grams (0.05 mole) of calcium in 300 milliliters of liquid ammonia. The excess ammonia was permitted to weather off, and a bright gold solid residue product was formed, which was ground to a powder under a nitrogen atmosphere and then dried in a vacuum at 57° C. The residue product was analyzed and was found to contain less than 0.5 weight percent nitrogen.

One-tenth of a gram of the residue product was charged to a Pyrex glass polymerization tube containing 30 grams of ethylene oxide. The tube was sealed and then gently agitated at 90° C. for 43 hours. Three grams of a polymer having a reduced viscosity of 0.85 in acetonitrile were recovered.

What is claimed is:

1. A polymerization process which comprises contacting (a) a vic-epoxy compound of the formula

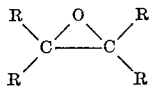

wherein each R individually represents hydrogen or an alkyl, alkoxymethyl, alkenyl, alkenyloxymethyl, aryl, aryloxymethyl, cycloalkyl, aralkyl, or alkaryl groups of up to 8 carbon atoms, or two R variables taken together to form a cycloalkyl nucleus of from 4 to 8 carbon atoms, with (b) a catalytically significant quantity of the residue product resulting from a process which comprises reacting calcium hexammoniate with from about 0.5 mole to about 2.0 moles per mole of said calcium hexammoniate of at least one member selected from the group consisting of triphenylmethane and fluorene, the reaction of said calcium hexammoniate with said member being conducted in an excess liquid ammonia medium at a temperature between above about the freezing point of ammonia and about 133° C., at a pressure sufficient to maintain said ammonia in a liquid state, and subsequently evaporating from the resulting reaction mixture the excess liquid ammonia; wherein said vic-epoxy compound is contacted with said residue product at a temperature in the range of from about 10° C. to about 150° C. for a period of time sufficient to produce a polyoxyalkylene polymer.

2. The polymerization process of claim 1 wherein said vic-epoxy compound is an alkylene oxide of from 2 to 4 carbon atoms.

3. The polymerization process of claim 1 wherein said vic-epoxy compound is ethylene oxide.

4. The polymerization process of claim 3 wherein said polymerization process is carried out in an inert, normally-liquid organic vehicle.

5. The process of claim 1 wherein said member is triphenylmethane.

6. The process of claim 1 wherein said member is fluorene.

No references cited.

WILLIAM H. SHORT, *Primary Examiner.*

T. PERTILLA, *Assistant Examiner.*